Sept. 12, 1933.  J. E. HOFFMAN  1,926,381
DISK HARROW
Filed Nov. 15, 1930
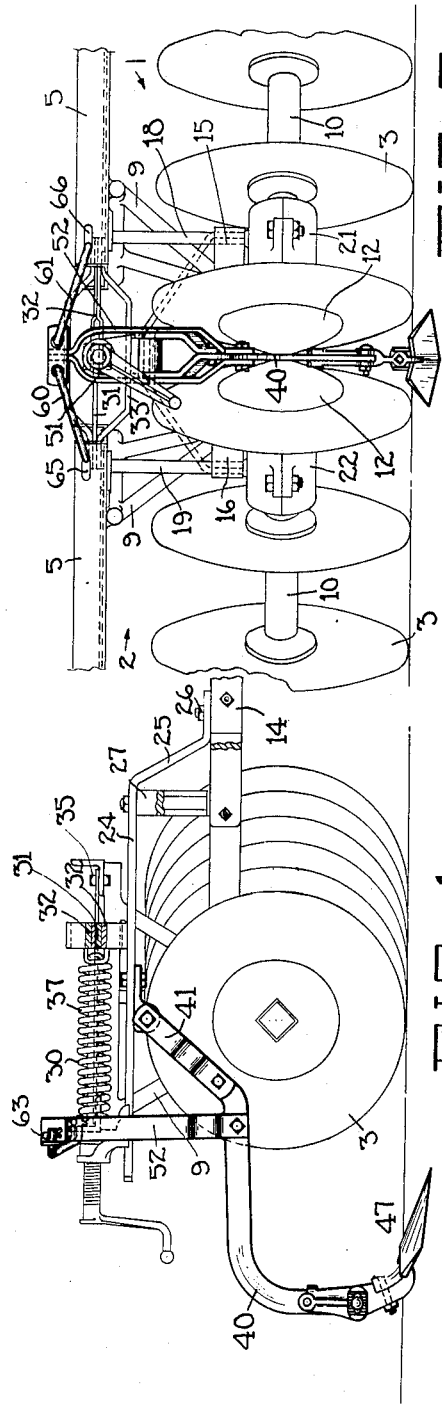
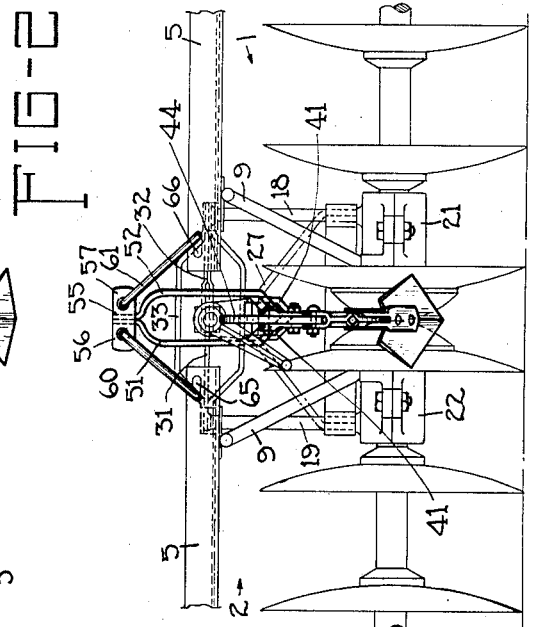
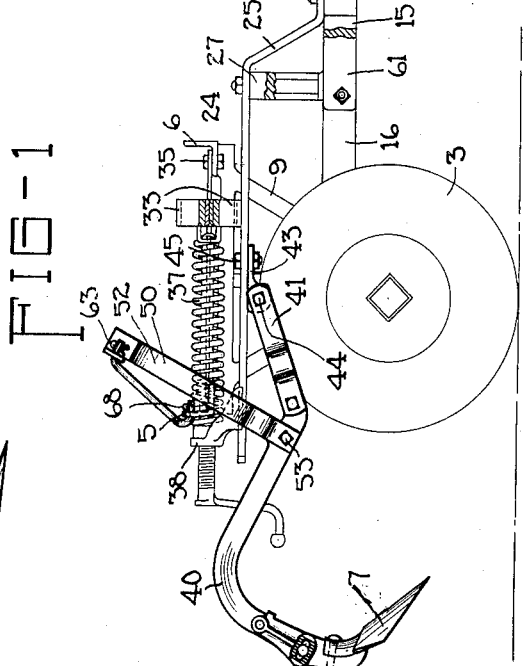
INVENTOR
John E. Hoffman
BY Brown, Jackson
Boettcher & Diener
ATTORNEY
WITNESS
Walter Ackerman Patented Sept. 12, 1933

1,926,381

UNITED STATES PATENT OFFICE 1,926,381

DISK HARROW

John E. Hoffman, Moline, Ill., assignor to Deere & Company, Moline, Ill., a corporation of Illinois Application November 15, 1930
Serial No. 495,931

22 Claims. (Cl. 55—82)

The present invention relates generally to agricultural implements of the soil working type, and more particularly to disk harrows.

Disk harrows of the type commonly in use today for pulverizing and packing the soil, both before and after plowing, usually include at least two angularly adjustable disk gang units, each unit including a plurality of disks arranged in axial alignment. These disk gangs or units are usually pivotally connected with some form of frame or other draft applying means, which may also include means for shifting or adjusting the disk gangs to bring the same into and out of axial alignment. The disk gangs are brought into axial alignment when the implement is to be transported, and when the implement is to be placed into operation the disk gangs are shifted into an angular relationship, one with respect to the other, for the purpose of breaking the surface of and pulverizing the soil.

Structural and manufacturing requirements usually make it necessary that the disk gangs be separated a short distance. While this distance is, as a rule, actually quite small, it nevertheless is sufficient to leave a ridge of unworked ground. This obviously interferes with the proper and adequate preparation of the seed bed.

One object of the present invention, therefore, is to provide a new and improved auxiliary soil working tool or center-cut attachment for use with disk harrows having the above mentioned characteristics for cutting out the middles left in the center between the two disk gangs. Another object of the present invention is to provide such an attachment with means whereby it is automatically raised and lowered when the gangs are shifted out of and into working position. That is, when the gangs are shifted to their straightened or axially aligned position the center cut attachment is automatically raised to bring the soil working tool thereof out of its ground engaging position. Another object of the present invention is to provide, in such an attachment, means for allowing the usual angular adjustments to be made while the gangs are in their operating position without affecting the center cut attachment or the soil working tool forming a part thereof.

Other objects and advantages of the present invention will be apparent to those skilled in the art after a consideration of the following detailed description of the preferred structural embodiment, taken in conjunction with the accompanying drawing, wherein such structural embodiment is illustrated, and in which:—

Figure 1 is a side elevation of a disk harrow provided with my improved center cut attachment, the view being taken substantially in the center of the disk harrow;

Figure 2 is a rear view showing the inner ends of both of the disk gangs and the associated center cut attachment;

Figure 3 is a view corresponding to Figure 1, but showing the relation between the center cut attachment and the gangs when the latter are arranged in axial alignment; and Figure 4 is a rear view corresponding to Figure 2, but showing the parts as they are arranged when the gangs are in axial alignment and the harrow is arranged for transport.

Referring now to the drawing, it will be observed that I have chosen to illustrate my invention in connection with a disk harrow of the type illustrated in a co-pending application of Charles H. White, filed October 13, 1928, Serial No. 312,325. Inasmuch as the disk harrow per se forms no part of the present invention, it has been illustrated more or less diagrammatically, but for more details relating to the disk harrow, reference may be had to the above mentioned copending application. For the purposes of this disclosure, it is sufficient to note that reference numerals 1 and 2 designate, respectively, the right and left hand disk gang units, each comprising a plurality of disks 3 arranged to rotate about a common axis. As best shown in Figure 2, the disks 3 of the two gangs face in opposite directions, otherwise one disk gang is the duplicate of the other.

Each gang comprises a gang frame built up of two parallel angle bars 5 and 6 which are suitably braced in spaced apart relationship and to which are secured suitable depending brackets 9, in the lower ends of which the axle 10 of each disk gang is journaled. The innermost disk of each of these gangs is provided with a bumper plate 12. These bumper plates are adapted to contact with one another so that the lateral reaction of each of these gangs is resisted by the lateral reaction of the other of these gangs. In addition, the bumpers 12 are rounded and serve to roll one on the other as the gangs are angularly shifted in adjusting their angularity in working position or in bringing them from their aligned transport position to their angled soil working position or vice versa.

As more clearly disclosed in the above mentioned copending application, suitable means are provided for shifting the gangs to and from their aligned or transport position and also for adjusting the angularity of the gangs when they are angled or in working position. Means for angling the gangs per se is not a part of the present invention. It suffices, therefore, to state that such means includes a member or frame in the form of a bar 14 which at its rearward end is provided with a pair of laterally spaced arms 15 and 16 forming a yoke to which the inner ends of the gangs 1 and 2 are respectively connected. Preferably, this connection is established by means of posts 18 and 19 rising respectively from journal bearings 21 and 22 associated with the disk gangs 1 and 2 as best shown in Figures 2 and 4. The arms 15 and 16 are respectively pivoted to the posts 18 and 19, and these parts also serve to define vertical axes about which the gangs 1 and 2 are shifted. The bar 14 serves also as means for applying draft to the implement.

The means for shifting or angling the gangs are more clearly disclosed and claimed in the above mentioned copending application, and hence it will suffice here to state that the bar 14 serves not only as a draft member or frame by which the forward draft is transmitted to the gangs, but also as means operable in the shifting operation for adjusting and changing the angular relation between the two disk gangs 1 and 2. The member 14 carries a supporting bar 24 at its rear end, the supporting bar being provided for this purpose with a down-turned end 25 adapted to be connected to the bar 14 by any suitable means, such as a bolt 26. In rear of the bolt 26 the bar 24 is secured to the arms 15 and 16 by means of a yoke or brace 27.

Upon the rear end of the supporting bar 24 is mounted means for resisting the upward thrust between the inner ends of the gangs, more clearly disclosed and claimed in the above mentioned copending application. Briefly, this means includes an adjustable spring mechanism indicated in its entirety by the reference numeral 30 which comprises a pair of horizontally pivoted bell crank levers 31 and 32 mounted for swinging movement about the outer ends of brackets 33 carried by the supporting bar 24. An arm of each of the bell crank levers 31 and 32 extends forwardly and is pivotally connected, as at 35, to one of the disk gangs while the other arm of each of these bell crank levers 31 and 32 extend inwardly and is connected to the forward end of a spring 37, the rear end of which is adjustably secured to a bracket 38 carried at the rear end of the supporting bar 24. Thus any upward thrust at the center of the harrow which causes a separation of the forward ends of the levers 31 and 32 is resisted by the tension of the spring 37.

The center cut attachment proper comprises a tool carrying beam 40 connected at its forward end to a pair of curved bars 41 which, in turn, are pivotally mounted on the supporting bar 24 by means of a journal bracket 43 to which the bars 41 are secured, as by a bolt 44. The bracket 43 may be removably secured to the supporting bar 24 by a bolt 45 or any other equivalent means. The rear end of the tool carrying beam 40 is turned downwardly to provide for convenient attachment of a soil tilling tool 47 which, as best shown in Figures 2 and 4 is positioned substantially in a plane between the disk gangs 1 and 2 and is adapted to cut out the middle or ridge of earth left by the gangs 1 and 2.

An important feature of the present invention relates to the means for raising and lowering the tool 47 and the associated tool beam 40. In the illustrated embodiment this means comprises an upwardly extending member 50 comprising two oppositely bowed bars or members 51 and 52 which are bolted to the beam 40 by a bolt 53. The two bars 51 and 52 are so curved as to embrace the spring 37 and to converge above the spring at their upper ends, as best shown in Figures 2 and 4, at which point a plate or clip 55 is welded, thus effectively securing the bars 51 and 52 together and also providing lateral extensions 56 and 57.

Suitable holes are provided in the extensions 56 and 57 which are thus adapted to receive the ends of a pair of toggle links 60 and 61, these links having turned ends projecting through the extensions 56 and 57 and held in position therein by means of cotter pins 63.

The outer or lower ends of the links 60 and 61 are received in elongated slots 65 and 66 provided in the vertical flange of the rear angle member 5 of each of the disk gang units 1 and 2. Cotter pins 68 are also provided at the lower ends of the links 60 and 61 to hold them in position in the slots 65 and 66.

The operation of my improved attachment is substantially as follows: When the disk gangs 1 and 2 are moved from their operative position shown in Figure 2 into an aligned or transport position shown in Figure 4, the outer ends of the links 60 and 61 will engage the outer ends of the slots 65 and 66 so that the movement of the disk gangs to their aligned or transport position will move the outer ends of the links 60 and 61 towards each other and thus cause them to exert a lifting effort upon the clip 55 and thereby lift the tool carrying bar or beam 40 into the position shown in Figure 3. The links 60 and 61 thereby act as toggle links and serve, at first, as means for rapidly lifting the tool beam 40, and as the beam 40 approaches its raised position the lifting of the same is accomplished at a slower rate.

When the gangs are moved from their transport position as shown in Figures 3 and 4 to their angled position such as indicated in Figures 1 and 2, the angle members 5 are drawn away from each other, whereas in moving the gangs to their transport position the angle members 5 were drawn in toward each other. This particular result is attained by reason of the fact that the angle members 5 are in rear of the pivotal axes of the two disk gangs as defined by the posts 18 and 19. As the angle members 5 move away from each other this allows the lower ends of the links 60 and 61 to move apart thereby allowing the soil tilling tool beam 40 to move downwardly, thereby lowering the tool 47 into operative or soil working position. The dimensions of the beam 40 and associated structure are so proportioned that the tool 47 will be running at its normal operating depth, as shown in Figures 1 and 2, at the time the disk gangs are angled to their minimum degree of angularity at which the gangs are ordinarily operated. When deeper penetration of the disks is desired they must be shifted to a greater angle. The slots 65 and 66 being elongated thus allow the disk gangs to be moved to their maximum angled position without affecting the position of the center cut tool, the links 60 and 61 merely moving toward the inner ends of the slots 65 and 66. This is the position shown in Figure 2.

The tool 47 is so set that its natural suck will not cause it to operate any deeper than the desired depth. Angling the gangs to a greater degree of angularity will not affect the position of the tool 47, as pointed out above, by reason of the provision of the elongated slots 65 and 66 which permit a greater separation of the angle members 21 and 22 without forcing the outer ends of the links 60 and 61 further apart. This construction thereby provides a floating connection in connection with the raising and lowering means and so that adjustment of the gangs for more or less angling in their operative position will not affect the operating depth of the tool 47, the latter normally retaining its desired depth by reason of the proportions of the beam 40 and the natural suck of the tool itself, as pointed out above.

Under certain conditions, however, the tool 47 may exert a tendency to run too deep. By reason of the bars 51 and 52 embracing the adjusting spring 37, the bars and the spring serve as means for limiting the downward position of the beam 40. When the tool 47 tends to run into the ground the upper ends of the bars 50 and 51 come into contact with and rest down upon the spring 37. The depth to which the tool 47 can operate is therefore limited. In this way the load on the tool 47 occasioned by running too deep, which load otherwise would be in excess of that for which the parts have been designed, is limited. When the gangs are in their operative or angled position, the tool beam 40 is limited in its upward movement by contact of the outer ends of the links 60 and 61 with the inner ends of the slots 65 and 66, as shown in Fig. 2.

While I have shown and described the preferred structural embodiment, it is to be understood that my invention is not to be limited to the specific means disclosed, but that, in fact, widely different means may be employed in the practice of the broader aspects of my invention.

What I claim, therefore, and desire to secure by Letters Patent is:—

1. In a disk harrow, the combination of two oppositely extending shiftable disk gangs, a draft member pivotally connected to said gangs at their inner ends, a soil tilling tool adapted to till the soil between the gangs and pivoted to said member for up and down swinging, and means operated by shifting of the gangs for swinging said tool.

2. In a disk harrow, the combination of two oppositely extending shiftable disk gangs, a draft member, means pivotally connecting the gangs to said member for relative movement about vertical axes, a soil tilling tool adapted to till the soil between the gangs and pivoted to said member for up and down swinging, and means connected to said gangs and spaced longitudinally from said axes for raising and lowering said tool when the gangs are shifted.

3. In a disk harrow, the combination of two oppositely extending disk gangs, draft means connected therewith, means for changing the angle between said gangs, a substantially vertically movable soil tilling tool operating in a plane between said gangs, and means responsive to separating movement of the gangs for lowering said tool.

4. In a disk harrow, the combination of two oppositely extending disk gangs, draft means connected therewith, means for changing the angle between said gangs, a substantially vertically movable soil tilling tool operating in a plane between said gangs, and means responsive to relative lateral movement of the gangs for raising and lowering said tool.

5. The combination with a disk harrow comprising a pair of pivoted disk gangs each having a frame, and means for shifting the gangs, of a substantially vertically movable soil tilling tool carried by the frame, and means responsive to such shifting of the gangs for raising and lowering said tool as the gangs are shifted from and to a working position and having a lost motion connection with the gang frames, said connection permitting the gangs to be shifted in a certain position of the gangs without effecting movement of the tool.

6. In a disk harrow, the combination of two oppositely extending disk gangs, a draft member connected to the gangs, a soil tilling tool pivoted to said member for vertical movement, and means including a member cooperating with one of said gangs for effecting raising and lowering of said tool.

7. In a disk harrow, the combination of two oppositely extending disk gangs, a draft member connected to the gangs at their inner ends, a soil tilling tool pivoted to said member for vertical movement, and means actuated by the shifting of the gangs for raising and lowering said tool.

8. In a disk harrow, the combination of two oppositely extending mutually reacting disk gangs, a draft member associated therewith, adjustable spring mechanism mounted on said member and operatively connected to resist up-thrust of the ends of the gangs, an auxiliary tool beam pivoted to said member and provided with a tilling tool thereon, and raising and lowering means for said tool beam including a member cooperating with said spring mechanism for limiting the movement of said tool beam in one direction.

9. In a disk harrow, the combination of two oppositely extending mutually reacting disk gangs, a draft member associated therewith, adjustable spring mechanism mounted on said member and operatively connected to resist up-thrust of the ends of the gangs, an auxiliary tool beam pivoted to said member and provided with a tilling tool thereon, and raising and lowering means for said tool beam including a pair of members formed to embrace and lie above said spring mechanism, and adapted to contact therewith to limit the downward movement of said tool beam.

10. In a disk harrow, the combination of two oppositely extending mutually reacting shiftable disk gangs, a draft member associated therewith, adjustable spring mechanism mounted on said member and operatively connected to resist up-thrust of the ends of the gangs, an auxiliary tool beam pivoted to said member and provided with a tilling tool thereon, and raising and lowering means for said tool beam including a member cooperating with said spring mechanism for limiting the movement of said tool beam in one direction and means connecting said member with said gangs for swinging the member in the other direction when the gangs are shifted.

11. The combination with a disk harrow comprising a pair of relatively angularly shiftable disk gangs, of a substantially vertically movable soil tilling tool, means responsive to said angular shifting of the gangs and including a member cooperating with one of said gangs for raising and lowering said tool, and means for limiting the movement of said tool in one direction.

12. The combination with a disk harrow comprising a pair of relatively movable disk gangs, of a substantially vertically movable soil tilling tool, means responsive to such movement of the gangs for raising and lowering said tool, and means for limiting the upward and downward movement of said tool, said first means including a member slidably cooperating with one of said gangs.

13. An attachment for disk harrows having angularly adjustable disk gangs pivoted on vertical axes at their inner ends and a draft frame pivotally connected to the gangs at said axes, said attachment comprising a pivotally mounted tool beam carrying a soil tilling tool, and separate means for raising and lowering said tool and responsive to said angular adjustment of said gangs on said axes.

14. A center cut attachment for disk harrows having two disk gangs each including a frame and angularly movable to cutting position and adapted to be straightened for transport position, angular movement of the gangs causing lateral movement of a portion of the frame of one gang relative to the corresponding portion of the frame of the other gang, said attachment comprising a substantially vertically movable soil tilling tool beam carried by said harrow, means securing the tool to the harrow, and means operable by the relative lateral movement of the portion of one disk gang frame to the corresponding portion of the other disk gang frame for raising and lowering said tool.

15. A center cut attachment for disk harrows having disk gangs angularly movable into axial alignment for transport and into angular relation for working position, said attachment comprising a substantially vertically movable tool beam and tilling tool for cutting out the middles left in the center between the two gangs, means connecting the forward portion of said beam with the harrow, an upwardly extending member carried by the beam, and connections therefrom to said gangs and operable upon movement of the gangs to aligned axial relation for raising the tool beam to inoperative position.

16. A center cut attachment for disk harrows having disk gangs angularly movable into axial alignment for transport and into angled relation for working the soil, said attachment comprising a substantially vertically movable tool beam and tilling tool for cutting out the middles left in the center between the two gangs, means connecting the forward portion of said beam with the harrow, an upwardly extending member carried by the beam, links connected with said member and extending downwardly and laterally for connection with said disk gangs, movement of the gangs to aligned position serving to bring the lateral ends of said links closer together and thereby raise the other ends and said tool beam.

17. The combination with a disk harrow comprising a pair of disk gangs adapted to be shifted into axial alignment for transport and to be shifted to angled relation and angularly adjustable therein for working the soil, of a substantially vertically movable soil tilling tool for cutting out the soil between the gangs, means for raising and lowering the tool as the gangs are movable from and to aligned non-working position, and means establishing a floating connection for the tool when the gangs are in working position whereby angular adjustment of the gangs in that position does not move said tool.

18. The combination with a disk harrow comprising a pair of disk gangs adapted to be shifted into axial alignment for transport and to be shifted to angled relation and angularly adjustable therein for working the soil, of a substantially vertically movable soil tilling tool for cutting out the soil between the gangs, means connecting the tool to said harrow, said means being so constructed and arranged that the natural suck of said tool tends to position said tool at a predetermined depth with respect to the disks, means for raising and lowering the tool as the gangs are movable from and to aligned non-working position, and means establishing a floating connection for the tool when the gangs are in working position whereby angular adjustment of the gangs in that position will not disturb the operating depth of said tool to which it has been positioned by said natural suck.

19. The combination with a disk harrow comprising a pair of disk gangs adapted to be shifted into axial alignment for transport and to be shifted to angled relation and angularly adjustable therein for working the soil, of a substantially vertically movable soil tilling tool for cutting out the soil between the gangs, means connecting the tool to said harrow, said means being so constructed and arranged that the natural suck of said tool tends to position said tool at a predetermined depth with respect to the disks, means for raising and lowering the tool as the gangs are movable from and to aligned non-working position, said means comprising a pair of toggle links inclined with respect to one another and each pivotally connected at one end with said tool and means establishing a slotted pivotal connection between the other end of each of said links and the gangs.

20. In a disk harrow, the combination of two oppositely extending angularly shiftable disk gangs pivoted on vertical axes at their inner ends, means for effecting pivoting of the gangs including a draft member pivotally connected to said gangs at their inner ends on said axes, a soil tilling tool adapted to till the soil between the gangs and pivoted to the draft member for up and down swinging movement, and means operated by shifting of the gangs about said axes for swinging said tool.

21. A center cut attachment for disk harrows having disk gangs angularly movable into axial alignment for transport and into angular relation for working position, said attachment comprising a substantially vertically movable tool beam and tilling tool for cutting out the middles left in the center between the two gangs, means connecting the forward portion of said beam with the harrow, an upwardly extending member carried by the beam, and connections therefrom to said gangs and operable upon movement of the gangs to aligned axial relation for raising the tool beam to inoperative position at first rapidly lifting the tool beam, and as the beam approaches raised position lifting the same at a slower rate.

22. In a disk harrow, the combination of two oppositely extending disk gangs, draft means connected therewith, means for changing the angle between said gangs, a shiftable soil tilling tool operating between said gangs, and means responsive to separating movement of the gangs for shifting said tool.

JOHN E. HOFFMAN.